Patented June 16, 1931

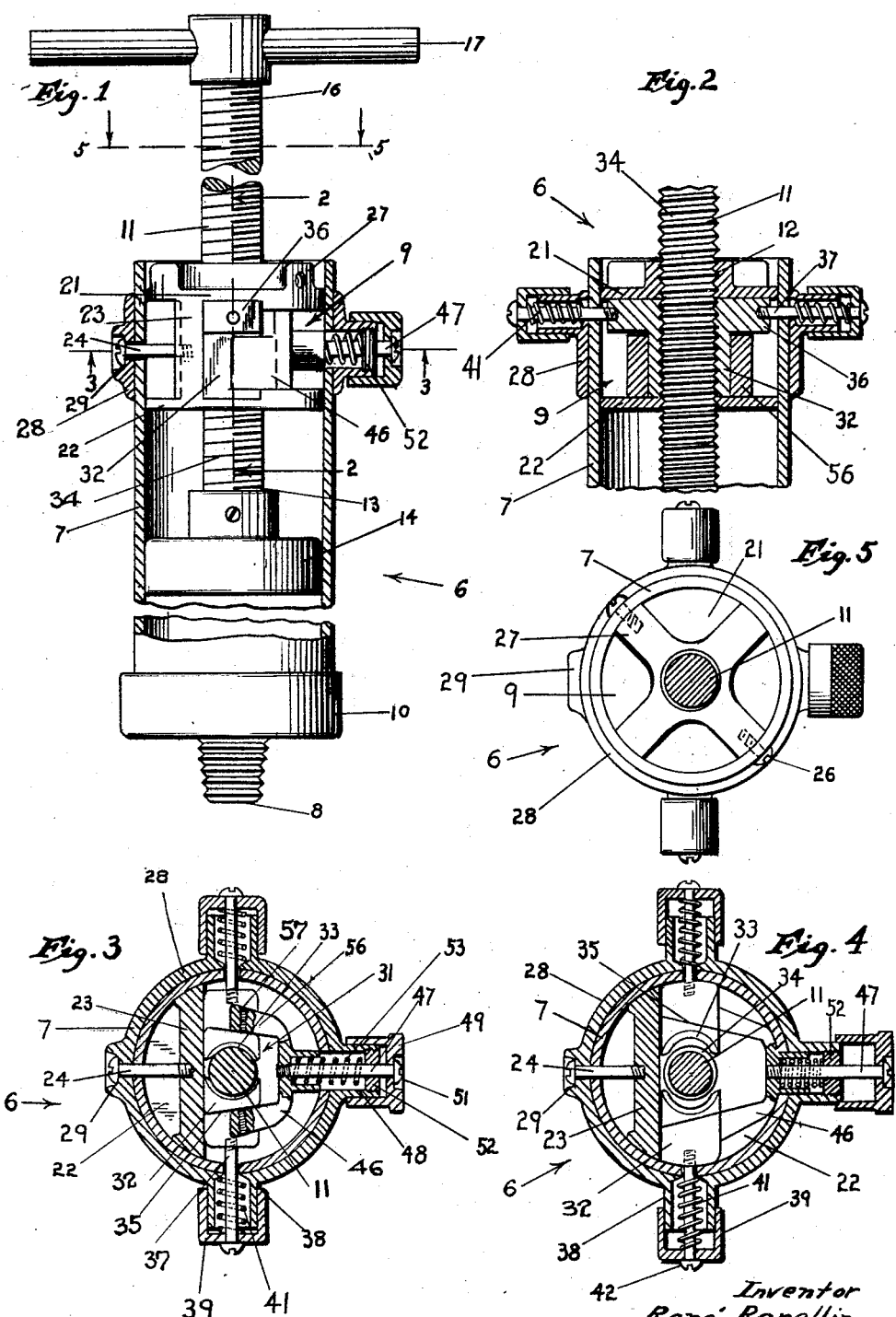

1,810,426

UNITED STATES PATENT OFFICE

RENÉ RAPELLIN, OF LOS ANGELES, CALIFORNIA

GREASE GUN

Application filed August 14, 1929. Serial No. 385,875.

This invention relates to feeding mechanisms, and more particularly to that type of feeding mechanism wherein the advance of a machine part is effected by rotating a feed screw within a nut threaded thereupon, either the nut or the feed screw being retained against lateral displacement to cause advance of any machine part connected to the other element of the feeding mechanism.

A more detailed object is the provision of a feeding mechanism, which, while being capable of practically universal application, is particularly designed for use as the means for forcibly ejecting the fluid or semi-fluid contents of a container, such for example, as a grease gun. As such, the device of the present invention, constitutes an improvement over those of my prior Patents, No. 1,724,616 and No. 1,724,617, issued August 13, 1929.

A further object of the present invention, is the provision of a quick-release feeding mechanism of improved design, whereby the nut within which the feed screw is threaded, is split into a plurality of parts which may be moved radially outwards from the screw, so as to disengage them therefrom and permit longitudinal movement of the feed screw in respect to the nut, without the necessity of rotating either the screw or the nut.

A more detailed object is the provision of a quick-release split nut mechanism as described, in which a yoke is so arranged that it may be moved into engagement with the outer faces of the nut parts, and thereby retain them in screw-engaging position, the yoke also being provided with means for quickly withdrawing it from engagement with the nut parts, to permit them to move radially outwards from the screw when it is desired to effect longitudinal movement of the latter without rotation.

A further object is the provision of means for preventing the yoke from being moved into that position in which it retains the nut parts in screw-engaging position until the entire number of nut parts have been so moved, the purpose being to prevent the possibility of overstressing the threads of any of the nut parts by engaging with the screw, any number of nut parts less than their total number, and then rotating the screw to develop a high pressure within the grease gun when a portion of the total number of nut parts are not in screw-engaging position.

An additional object is the provision of a screw feeding mechanism as described, which incorporates constructional refinements resulting in increased efficiency and ease of operation, and simplicity and ruggedness of construction.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a view principally in vertical, medial section, of a grease gun having incorporated therewith, a feeding mechanism embodying the principles of the present invention. Portions of the figure are broken away to reduce its length.

Fig. 2 is a vertical, medial, sectional view of the feeding mechanism, with its plane of section taken at right angles to that of Fig. 1, and indicated by the line 2—2 of that figure.

Fig. 3 is a horizontal sectional view taken upon the line 3—3 of Fig. 1, with the direction of view as indicated. This view shows the part of the split nut moved to screw-engaging position.

Fig. 4 is a view similar to Fig. 3, but showing the parts of the split nut moved from screw-engaging position.

Fig. 5 is a horizontal sectional view taken upon the line 5—5 of Fig. 1, with the direction of view as indicated.

In terms of broad inclusion, the feeding mechanism of the present invention, comprises a feeding screw longitudinally slidable within a suitable guide, and a plurality of split nut parts also slidably mounted within said guide but laterally in respect to the screw, to permit the nut parts to be moved optionally into or out of engagement with the threads of the screw. A locking yoke is mounted within the guide for sliding movement within the plane of movement of the nut parts, the various elements of the feeding mechanism being so proportioned and arranged that the yoke may be engaged with the outer faces of the nut parts to releasably retain them in screw-engaging position, or may be withdrawn therefrom, and to permit the nut parts to move away from the feeding screw when it is desired to move the feed screw longitudinally without the necessity of imparting rotation thereof.

Specifically describing the invention in its most practical embodiment of which I am at present aware, it is herein shown and described as being operatively associated with a conventional grease gun indicated in its entirety at 6, and comprising a cylindrical barrel 7 having an outlet 8 at its lower end, and having its upper end closed by a head 9. The outlet 8 is carried by a removable head 10, and the head 9 serves as a guide for a feed screw 11 which extends slidably through a central aperture 12 therein, the inner end 13 of the feed screw 11, having a suitable cup leather 14 or its equivalent, preferably swivelled thereto, and the outer end 16 of the feed screw 11, being provided with a suitable handle 17.

The head 9 is preferably composed of spaced plates 21 and 22, rigidly connected by a preferably integral web 23. The head 9 is retained rigidly in position by means of a screw 24 passing through the barrel 7 and threaded into the web 23, and also by a plurality of screws 26 threaded through the barrel 7 and into lugs 27 formed on the outer face of the plate 21. For the purpose of imparting greater strength to the entire structure, I have deemed it advisable to position a collar 28 upon the outside of the barrel 7, in position to encircle the head 9; and the screw 24 also passes through this reinforcing ring 28, a suitable socket 29 being preferably provided for the reception of the head thereof.

A split nut indicated in its entirety at 31, is cooperatively associated with the screw 11, and is composed of a plurality of parts 32. In its preferable arrangement, the nut 31 comprises two diametrically opposed parts 32, which are slidably mounted between the plates 21 and 22 of the head 9, and upon opposite sides of the proximal portion of the feed screw 11. The inner face of each nut part 32, is provided with partial threads 33 complementary to the threads 34 of the screw 11, and the outer face 35 of each nut part 32, is provided with a projection 36 to which a suitable pin such as a machine screw 37 is rigidly attached. Each pin 37 extends from the associated nut part 32, and radially outwards in respect to the feed screw 11, through the proximal portion of the barrel 7, and through an extended socket 38 formed on the outer face of the reinforcing ring 28. A cap 39 mounted upon each pin 37, is so proportioned that it is slidably disposed over the outside of the associated socket 38; and a coil spring 41 under compression between the bottom of the associated socket 38 and its cap 39, presses the cap 39 outwards against the head 42 of the screw, so as to impose spring tension upon the pin 37, and continuously urge the associated nut part 32 outwards from the feed screw 11.

A locking or clamping yoke 46 is also slidably mounted between the plates 21 and 22 of the head 9, for movement in the plane of movement of the nut parts 32, but laterally in respect to their line of movement. The yoke 46 is restricted to this type of movement by means of a guide pin 47 such as a machine screw threaded to the yoke 46 and extending through the proximal portion of the barrel 7 and through another extended socket 48. Preferably the guide pin 47 is also provided with a cap 49 which is slidably disposed over the associated socket 48 and retained upon the screw 47 by means of its head 51. A bushing 52 is threaded into the outer end of the socket 48, the pin 47 extending slidably therethrough; and a coil spring 53 is under compression between the bushing 52 and the outer face of the yoke 46, imposing spring tension thereupon to continuously urge the yoke 46 radially inwards.

The yoke 46 is bifurcated to provide a pair of opposed inner ends 56, which preferably are arranged at a slightly oblique angle so that the distance therebetween is greater at their extreme ends than at a point spaced from the extreme ends. The outer faces 35 of the nut parts 32, are also formed at this degree of obliquity, the parts being so proportioned and arranged that when the nut parts 32 are slid radially inwards against the action of their respective springs 41, and far enough to bring their partial threads 33 into mesh with the threads 34 of the feed screw 11, the ends 56 of the yoke 46, will slip behind the outer faces 35 to retain the nut parts 32 in threaded engagement with the feed screw 11. Inasmuch as the spring 53 continuously urges the yoke 46 inwards, a wedging action will be developed due to the obliquity of the ends 56 of the yoke 46, and outer faces 35 of the nut parts 32 abutting to press the nut parts 32 firmly against the feed screw 11. Each of the ends 56 of the yoke 46, is provided with a set screw 57 threaded therethrough so that after the outer faces 35 of the nut parts 32 and/or the inner faces of the ends 56 of the yoke have become worn at their areas of frictional engagement, the set screws 57 may be adjusted to bring their inner ends into such position that the wear is compensated for. As best shown upon Fig. 4, the length of the ends 56 of the yoke 46, is such that when the yoke 46 is retracted against the action of the associated spring 53, the sides of the nut parts 32 proximal to the yoke 46, will just clear the extreme ends thereof, permitting the nut parts 32 to move radially outwards.

The following is a brief description of the method of operation of the grease gun described hereinabove.

Assuming that the nut parts 32 are at their outer extreme of movement, i. e., in that position indicated upon Fig. 4, the drive screw 11 and its cup leather 14 may be freely reciprocated longitudinally of the barrel 7. When so arranged, the grease gun is of utility in handling fluids, inasmuch as the outlet 8, which conveniently is in the form of a suitable nipple, may be immersed in a supply of the fluid, and the drive screw then drawn backwards by means of the handle 17, creating an area of low pressure within the barrel 7, causing a quantity of the fluid to be forced into the barrel by atmospheric pressure. After the barrel 7 has been partially or completely filled, the fluid may be deposited wherever desired, by placing the nipple 8 adjacent the point at which the fluid is to be deposited, and then forcing the drive screw 11 longitudinally toward the bottom of the barrel 7.

When it is desired to handle heavier fluids or semi-fluid substances such as grease, filling the barrel 7 with such a commodity, may be accomplished by retracting the drive screw 11 and cup leather 14 toward the head 9. The grease or other substance may then be deposited within the barrel 7 by removing the head 10, after which this head should again be mounted upon the end of the barrel 7. The grease gun is then in condition for discharging the grease therefrom through the outlet 8. If it be desired to develop a relatively large amount of pressure upon the contents of the barrel 7 so as to cause its being ejected therefrom with considerable force, the nut parts 32 should be moved into engagement with the drive screw 11, this being effected merely by pressing inwards upon the caps 39 which are upon opposite sides of the head end of the barrel 7. As the nut parts 32 approach their inner extreme of movement, the spring 53 will force the yoke 46 inwards so that its ends 56 engage the obliquely disposed outer faces 35 of the nut parts 32, developing the wedging action referred to hereinabove, and thus causing the nut parts 32 to be seated firmly in proper relation to the screw shaft 11, to permit the advance thereof by its rotation which may be effected by means of the handle 17. Obviously, the pitch of the threads 34 and complementary partial threads 33, should be such that the necessary degree of mechanical advantage is gained to impose the desired amount of pressure upon the contents of the barrel 7. When it is desired to again permit free longitudinal movement of the drive screw 11, the only step necessary to effect removal of the nut parts 32 from their engagement with the drive screw 11, is to pull outwards upon the cap 49, causing the yoke 46 to become disengaged from the outer faces 35 of the nut parts 32, and thus permitting the springs 41 to press the nut parts 32 outwards and out of engagement with the drive screw 11.

Owing to the fact that the sides 57 of the nut parts 32, slide past the extreme ends of the yoke 46 as the nut parts 32 move outwards, it will be impossible for either of the nut parts 32 to be locked in screw-engaging position until the other part 32 is also in engagement with the threads of the screw. This feature obviously prevents overstressing the partial threads of either of the nut parts, as would result if the drive screw 11 were rotated with any appreciable degree of force when engaged with only one of the nut parts 32.

It is to be understood that the details of the invention as herein disclosed, are subject to alteration within the spirit or scope of the appended claims.

I claim:

1. A feeding mechanism comprising a feed screw, guiding means having said screw slidably extending therethrough, a split nut having its parts threaded complementarily to said screw, means slidable radially of said guiding means for moving said nut parts to bring the threads thereof optionally into or out of mesh with the threads of said screw, and means engageable with said nut parts for retaining them in selected position.

2. A feeding mechanism comprising a feed screw, guiding means having said screw slidably extending therethrough, a split nut having its parts threaded complementarily to said screw, means rigid with said nut parts and accessible exteriorly of said guiding means for moving said nut parts into engagement with said screw, spring means normally holding said nut parts at one extreme of their movement, and means slidably mounted on said guiding means and releasably engageable with said nut parts to hold them at the other extreme of their movement.

3. A feeding mechanism comprising a feed screw, guiding means having said screw slidably extending therethrough, a split nut having its parts threaded complementarily to said screw, means slidable radially of said guiding means for moving said nut parts into engagement with said screw, spring means normally holding said nut parts out of engagement with the screw, and means slidably mounted on said guiding means and releasably engageable with said nut parts to hold them in engagement with the screw.

4. A feeding mechanism comprising a feed screw, guiding means having said screw slidably extending therethrough, a split nut having its parts threaded complementarily to said screw, means for moving said nut parts into engagement with said screw, spring means normally holding said nut parts out of engagement therewith, and a yoke slidable in the plane of movement of said nut parts and releasably engageable therewith to retain them in screw-engaging position.

5. A feeding mechanism comprising a feed screw, guiding means having said screw slidably extending therethrough, a split nut having its parts threaded complementarily to said screw and slidably mounted in said guiding means, a pin rigid with each nut part and extending therefrom radially in respect to said screw and through the guiding means, a spring interposed between each nut part and the guiding means urging said part radially outwards, and a yoke mounted in said guiding means for movement laterally in respect to the line of movement of said nut parts, said yoke being releasably engageable with the outer faces of both nut parts when said parts are in screw-engaging position.

6. A feeding mechanism comprising a feed screw, guiding means having said screw slidably extending therethrough, a split nut having its parts threaded complementarily to said screw and slidably mounted in said guiding means, a pin rigid with each nut part and extending therefrom radially in respect to said screw and through the guiding means, a spring interposed between each nut part and the guiding means urging said part radially outwards, a yoke mounted in said guiding means for movement laterally in respect to the line of movement of said nut parts, said yoke being releasably engageable with the outer faces of both nut parts when said parts are in screw-engaging position, and a pin rigid with said yoke and extending through said guiding means whereby the yoke may be removed from engagement with said nut parts.

7. A feeding mechanism comprising a feed screw, a guiding means having said screw slidably extending therethrough, a split nut having its parts threaded complementarily to said screw and slidably mounted in said guiding means, a pin rigid with each nut part and extending therefrom radially in respect to said screw and through the guiding means, a spring interposed between each nut part and the guiding means urging said part radially outwards, a yoke mounted in said guiding means for movement laterally in respect to the line of movement of said nut parts, said yoke being releasably engageable with the outer faces of both nut parts when said parts are in screw-engaging position, a pin rigid with said yoke and extending through said guiding means whereby the yoke may be removed from engagement with said nut parts, and a spring interposed between said guiding means and said yoke urging the yoke into engaging position.

8. A feeding mechanism comprising a feed screw, guiding means having said crew slidably extending therethrough, a split nut having its parts threaded complementarily to said screw and slidably mounted in said guiding means, a pin rigid with each nut part and extending therefrom radially in respect to said screw and through the guiding means, a spring interposed between each nut part and the guiding means urging said part radially outwards, a yoke mounted in said guiding means for movement laterally in respect to the line of movement of said nut parts, said yoke being releasably engageable with the outer faces of both nut parts when said parts are in screw-engaging position, a pin rigid with said yoke and extending through said guiding means whereby the yoke may be removed from engagement with said nut parts, a spring interposed between said guiding means and said yoke urging the yoke into engaging position, and means retaining said yoke at its outer extreme of movement until all the nut parts have been moved to screw-engaging position.

9. In a grease gun, a head closing an end thereof, a feed screw slidably extending through said head, a split nut having its parts slidably mounted within said head and disposed upon diametrically opposite sides of the screw, the inner faces of said parts being threaded complementarily to the screw, a pin rigid with each nut part and extending therefrom radially in respect to the screw and through the head, a spring interposed between each nut part and the head urging said part radially outwards from the screw, a yoke mounted in said head for movement laterally in respect to the line of movement of said nut parts, said yoke being releasably engageable with the outer faces of both nut parts when said parts are in screw-engaging position, a pin rigid with said yoke and extending through said guiding means whereby the yoke may be removed from engagement with said nut parts, and a spring interposed between said head and said yoke urging the yoke into engaging position, an end of said yoke engaging a side of any nut part moved out of screw-engaging position.

10. A feeding mechanism comprising a feed screw, guiding means having said screw extending slidably therethrough, a split nut having its parts threaded complementarily to said screw and slidably mounted in said guiding means, a pin rigid with each of said nut parts and extending therethrough radially with respect to said screw and through said guiding means, spring means urging each of said nut parts away from said screw, and means for releasably holding said nut parts in engagement with said screw.

11. A feeding mechanism comprising a feed screw, guiding means having said screw extending slidably therethrough, a split nut having its parts threaded complementarily to said screw and slidably mounted in said guiding means, a pin rigid with each of said nut parts and extending therethrough radially with respect to said screw and through said guiding means, a cap on the outer end of each of said pins, a spring under compression between each cap and said guiding means, and means for releasably holding said nuts parts in engagement with said screw against the action of said springs.

12. A feeding mechanism comprising a feed screw, guiding means having said screw extending slidably therethrough, a split nut having its parts threaded complementarily to said screw and slidably mounted in said guiding means, a pin rigid with each of said nut parts and extending therethrough radially with respect to said screw and through said guiding means, and a cap on the outer end of each of said pins, a spring under compression between each cap and said guiding means.

In testimony whereof I have signed my name to this specification.

RENÉ RAPELLIN.